Oct. 15, 1963

G. MÖHRING ETAL 3,106,761

MOUNTING MEANS FOR TENTER PIN PLATES

Filed Aug. 2, 1960

INVENTOR
GUSTAV MÖHRING
JOHANNES MOHR

BY Lowry & Rinehart

ATTORNEYS

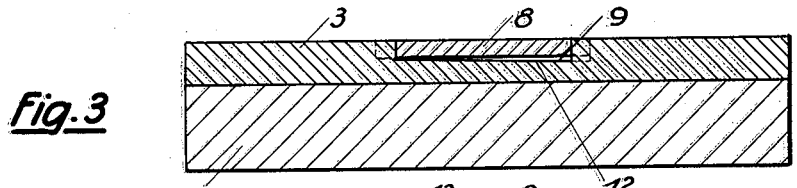
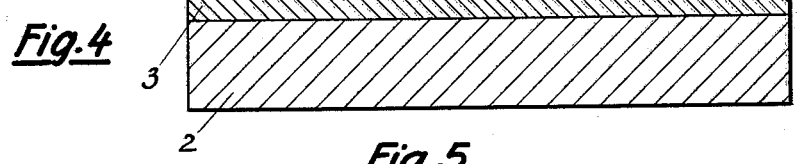
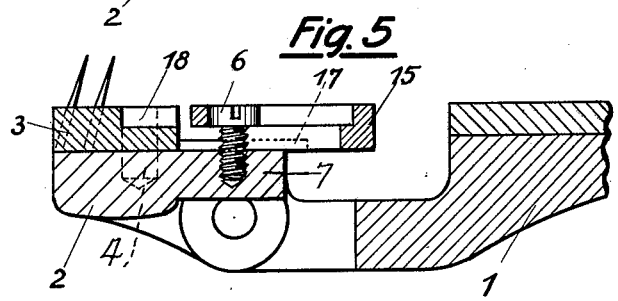
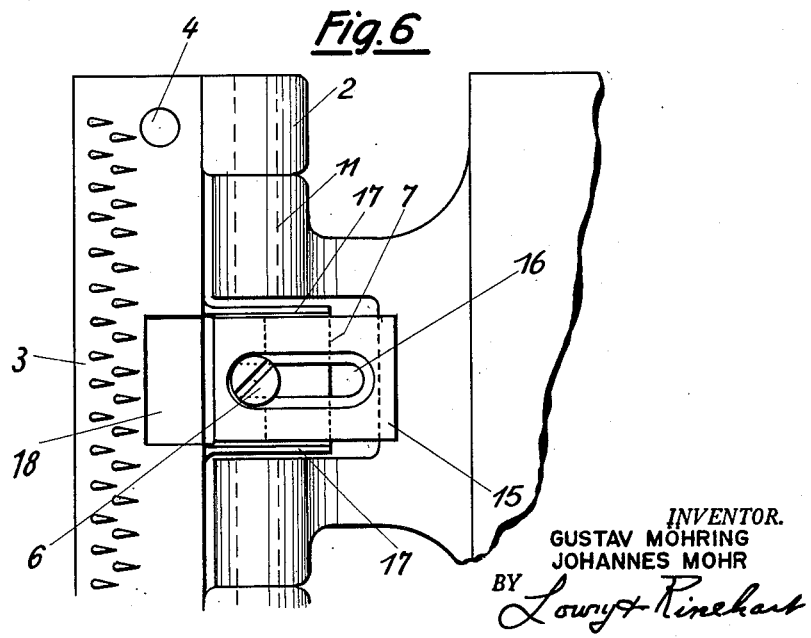

INVENTOR
GUSTAV MÖHRING
JOHANNES MOHR

BY Lowry & Rinehart

ATTORNEYS

United States Patent Office 3,106,761
Patented Oct. 15, 1963

3,106,761
MOUNTING MEANS FOR TENTER PIN PLATES
Gustav Möhring, Stuttgart, and Johannes Mohr, Fellbach, Germany, assignors to Famatex G.m.b.H., Stuttgart-Kornwestheim, Germany, a firm
Filed Aug. 2, 1960, Ser. No. 46,965
Claims priority, application Germany Aug. 3, 1959
9 Claims. (Cl. 26—62)

This invention relates to a tenter chain link equipped with a pin rack, such as is used, for example, in machines for the heat-treatment of cloth or the like.

In such machines, it is necessary for the pin racks to be cleaned or replaced at certain time intervals, and it is important to secure the pin racks on the chain links in a manner permitting the same to be mounted very quickly and with little difficulty and to be removed from the chain links just as quickly. As several hundreds of such chain links are used in a machine for the heat-treatment of cloth or the like, it is essential that the repair of the chain links be made as rapidly as possible.

These requirements are fulfilled by the present invention in that each pin rack is secured on its rack carrier by means of two or more fixing pins and by a locking member which is pivotally or shiftably mounted on the rack carrier and engages in a correspondingly shaped recess in the pin rack.

This novel mounting of the pin rack on the tenter chain link enables the pin rack to be very quickly removed and mounted with no special tool being required.

The locking member may be provided with an inclined undersurface, and/or the recess of the pin rack with an inclined basal surface. These inclined surfaces cause, on the locking member engaging in the recess, a wedging or cam action by means of which the pin rack is reliably clamped on its link body.

Two preferred embodiments of the invention will now be described by way of example and with reference to the accompanying drawings, in which:

FIG. 3 is a cross-sectional view on the line III—III of FIG. 2;

FIG. 4 is a view similar to FIG. 3 of a modified form of construction;

FIG. 5 is a cross-sectional view similar to FIG. 1 but showing another form of construction of the locking member, FIG. 6 is a top plan view of the form of invention shown in FIG. 5;

Figure 1:
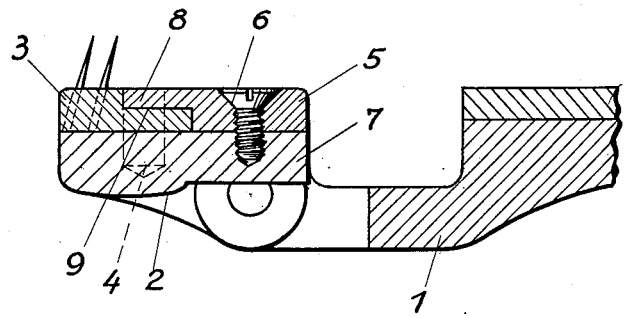
FIG. 1 is a cross-sectional view through a tenter chain link according to the invention, taken on the line I—I of FIG. 2.
Figure 2:
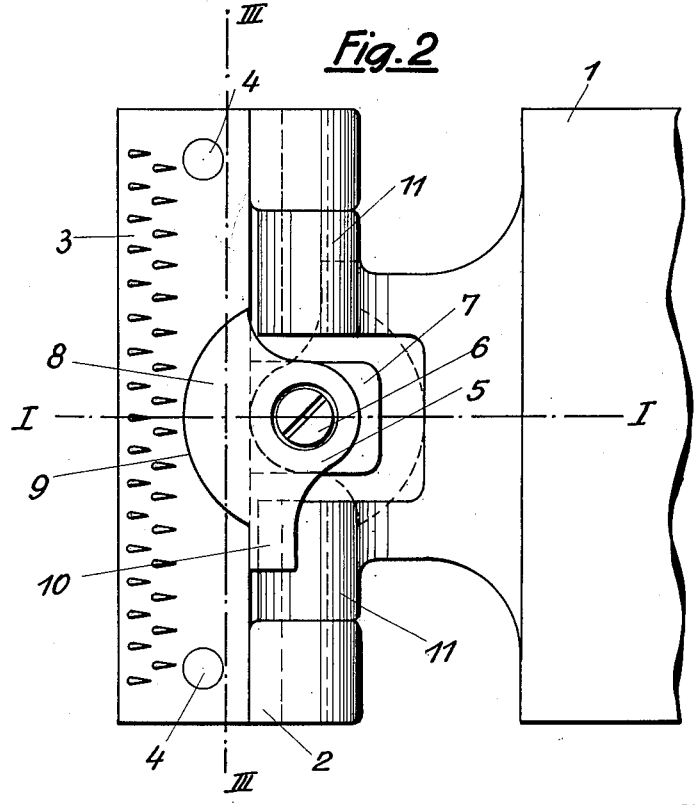
FIG. 2 is a top plan view of the tenter chain link shown in FIG. 1.
Figure 7:
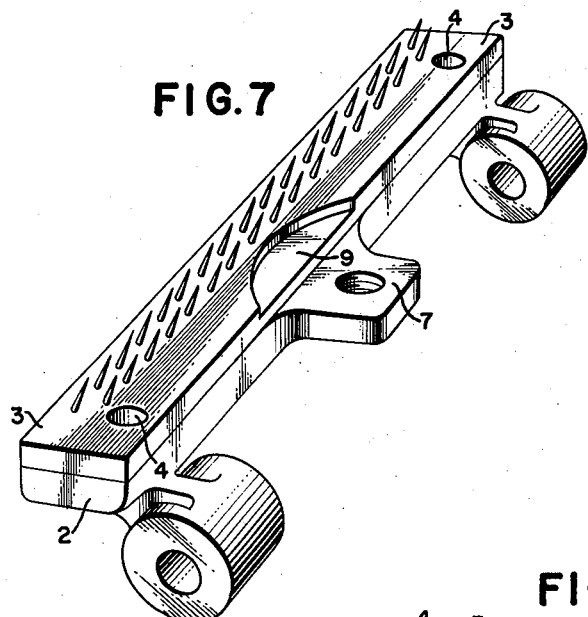
FIG. 7 is a perspective view of the pin rack and carrier of FIG. 1 with the locking element removed.
Figure 8:
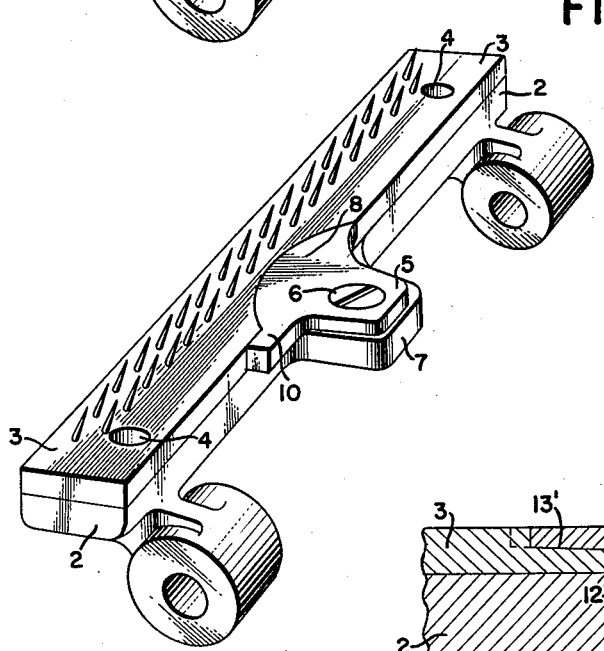
FIG. 8 is a perspective view of the pin rack, carrier and locking element for the pin rack and carrier assembled therewith as in FIG. 2.

As shown in FIGS. 1 and 2, a tenter chain link comprises a link body 1, a rack carrier 2 hingedly secured thereto by means of hinges 11, and a pin rack 3. The pin rack 3 rests in a flat manner on the rack carrier 2 and is held in its proper position by two fixing pins 4 forced into the rack carrier 2. It is self-evident that more fixing pins 4 may be used. Securement of the pin rack 3 is effected by a locking member 5 which has a segmental portion 8 and is pivotally mounted by means of a countersunk screw 6 on an extension 7 of the rack carrier 2 that projects between the hinges 11 of the rack carrier. The locking member 5 has its segmental portion 8 engaging in a correspondingly shaped recess 9 in the pin rack 3, the upper surface of the locking member 5 being flush with that of the pin rack 3. For better manipulation of the locking member 5, the same possesses a lug 10 provided on one side of the segmental portion 8 that serves at the same time as a stop for the locking member 5 in the clamping position thereof.

Figure 9:
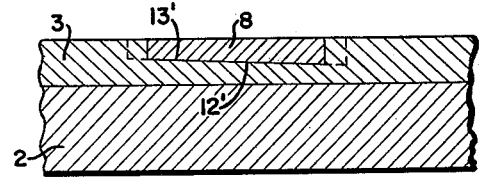
FIG. 9 is a cross-sectional view similar to FIGS. 3 and 4, showing a modification of the contacting faces of a portion of the locking member and the pin rack carrier.

To attain a wedging action and thereby an additional clamping of the pin rack 3 on its carrier 2 when the locking member 5 is turned into the recess 9 of the pin rack, it is either possible to provide the recess 9 with a slightly inclined basal surface 12, as shown in FIG. 3, or to provide the segmental portion 8 of the locking member 5 with a slightly inclined undersurface 13, as shown in FIG. 4, or, finally, to give the recess 9 a slightly inclined basal surface 12' and the segmental portion 8a slightly inclined under surface 13', as shown in FIG. 9.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. For example, the locking member may be so arranged on the rack carrier as to be shiftable in transverse direction, it being possible to use inclined surfaces also in this case.

The latter form of construction is shown by way of example in FIGS. 5 and 6 according to which a locking member 15 has an elongated slot 16 through which the countersunk screw 6 projects, and is arranged to be shiftable transversely to the longitudinal axis of the pin rack 3. Lateral webs 17 are provided at the extension 7 to serve as a guide for the locking member 15. In this form of construction, a rectangular recess 18 is shown in pin rack 3 but it would be of course possible to provide in this case a semicircular recess as shown in FIG. 2 which would cooperate with a locking member having a correspondingly shaped end.

We claim:

1. A tenter chain link comprising an exchangeable pin rack, a carrier for said pin rack, at least two fixing pins extending between said pin rack and said carrier, a locking member mounted on said carrier and movable parallel to the surface of said pin rack for securely holding said pin rack on said carrier against movement axially of said fixing pins and means for releasably securing said locking member to said carrier, the upper surface of said locking member having a segmental portion and said pin rack being provided with a correspondingly shaped recess for receiving said segmental portion of said locking member.

2. A tenter chain link as in claim 1 wherein the recess of said pin rack is provided with an inclined basal surface and said segmental portion of the locking member has an inclined undersurface and which surfaces cause a wedging action when said locking member engages in said recess for the clamping of said pin rack.

3. A tenter chain link as in claim 1 wherein the recess of said pin rack is provided with a planar basal surface and said segmental portion of the locking member has an inclined undersurface and which surfaces cause a wedging action when said locking member engages in said recess for the clamping of said pin rack.

4. A tenter chain link as in chain 1 wherein the recess of said pin rack is provided with an inclined basal surface which causes a wedging action when the segmental portion of said locking member engages in said recess for the clamping of said pin rack.

5. A tenter chain link as in claim 1 wherein the segmental portion of said locking member is provided with an inclined undersurface which causes a wedging action when engaged in said recess for the clamping of said pin rack.

6. A tenter chain link as in claim 1 wherein said pin rack carrier has hinge portions between which an extension is provided and a countersunk screw for holding said member on said extension.

7. A tenter chain link comprising an exchangeable pin rack, a carrier for said pin rack, at least two fixing pins extending between the lower surface of said pin rack and the upper surface of said carrier, a locking member mounted on said carrier and movable over and parallel to the upper surface of said pin rack for securely holding said pin rack down on said carrier against movement axially of said fixing pins, and screw means extending parallel to said fixing pins for releasably securing said locking member to said carrier.

8. A tenter chain link as in claim 7 wherein said locking member is pivotally mounted on said pin rack carrier.

9. A tenter chain link as in claim 7 wherein said locking member is slidably mounted on said pin rack carrier.

References Cited in the file of this patent

UNITED STATES PATENTS

| | | |
|---|---|---|
| 670,598 | Rusden | Mar. 26, 1901 |
| 1,163,145 | Gross | Dec. 7, 1915 |
| 1,393,083 | Campbell | Oct. 11, 1921 |

FOREIGN PATENTS

| | | |
|---|---|---|
| 1,028,549 | France | Feb. 25, 1953 |